United States Patent

[11] 3,603,926

| [72] | Inventor | Jack A. Kimura |
| | | St. Joseph, Mich. |
| [21] | Appl. No. | 738,644 |
| [22] | Filed | June 20, 1968 |
| [45] | Patented | Sept. 7, 1971 |
| [73] | Assignee | The Bendix Corporation |

[54] MASTER CYLINDER FLUID LEVEL INDICATOR
1 Claim, 6 Drawing Figs.

[52] U.S. Cl. .................................................. 340/59,
200/84 C, 340/244 A
[51] Int. Cl. ...................................................... B60t 17/22
[50] Field of Search ............................................ 340/59, 60,
244, 282; 200/84; 60/54.6

[56] References Cited
UNITED STATES PATENTS
3,204,230  8/1965  Hosford ........................ 340/59

3,421,322  1/1969  Reznicek ........................ 340/60 X

Primary Examiner—John W. Caldwell
Assistant Examiner—Howard S. Cohen
Attorneys—Richard G. Geib and Plante, Arens, Hartz & O'Brien ABSTRACT: A fluid indicator for closing an electrical circuit upon the approach of a low liquid level in a brake master cylinder reservoir employing a pair of resilient contacts within a switch housing with one of the contacts in electrical connection with the housing and another of the contacts in electrical connection with a connector terminal which are activated by a magnet within a float means which is positioned by the liquid level in the reservoir and including provisions to eliminate the effect of liquid motion in the reservoir on the operation of the switch.

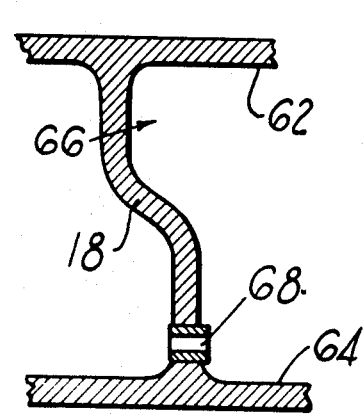
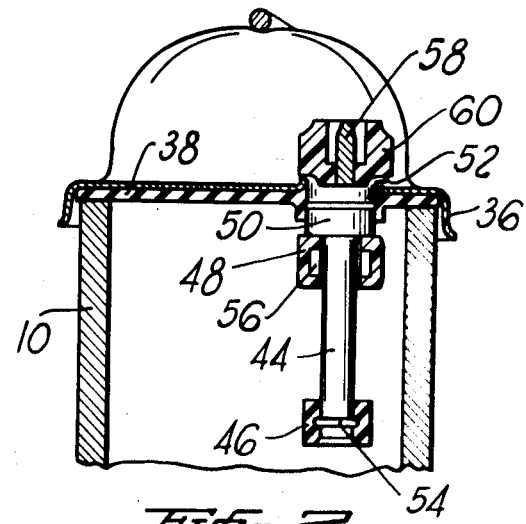
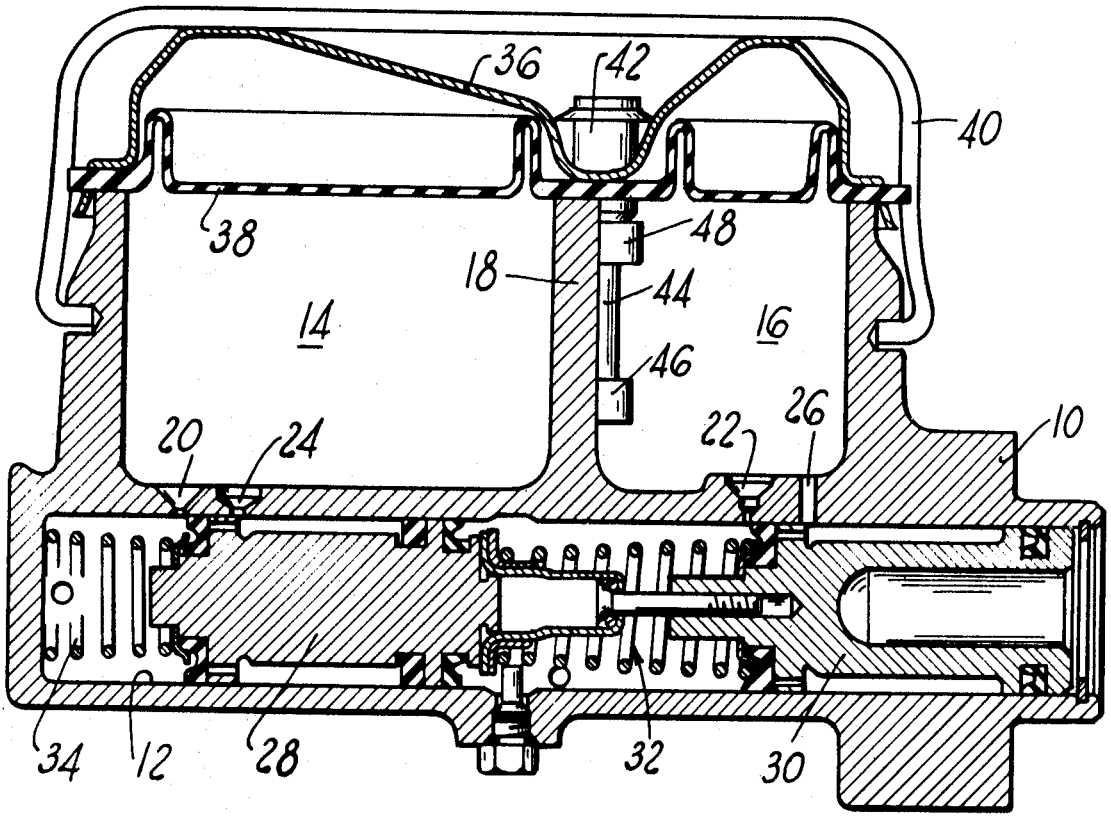

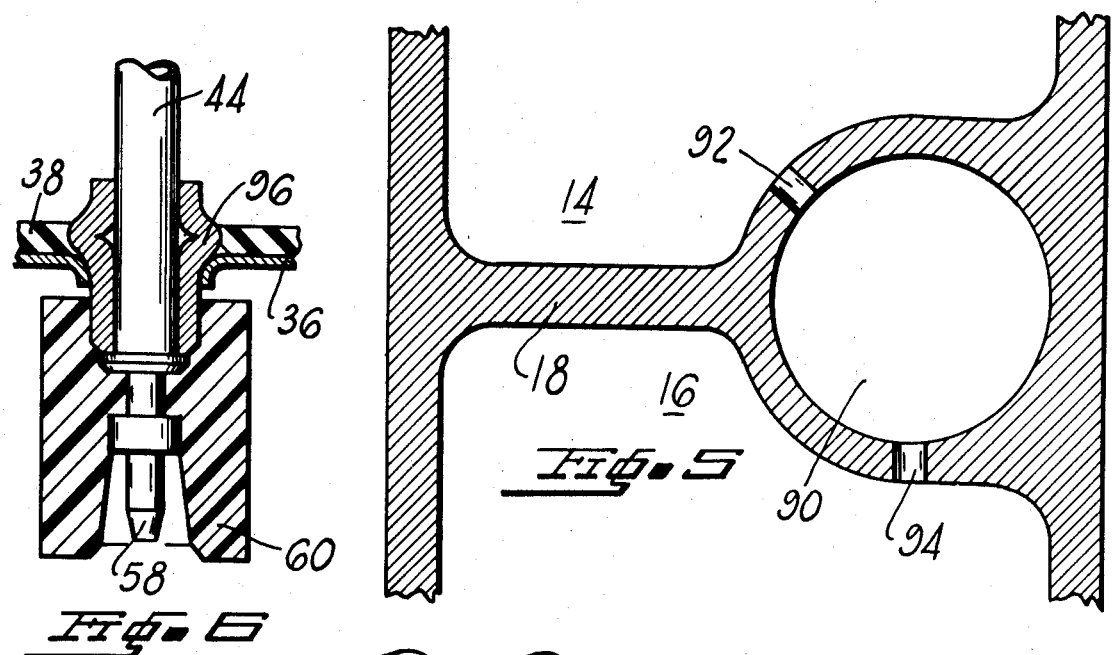
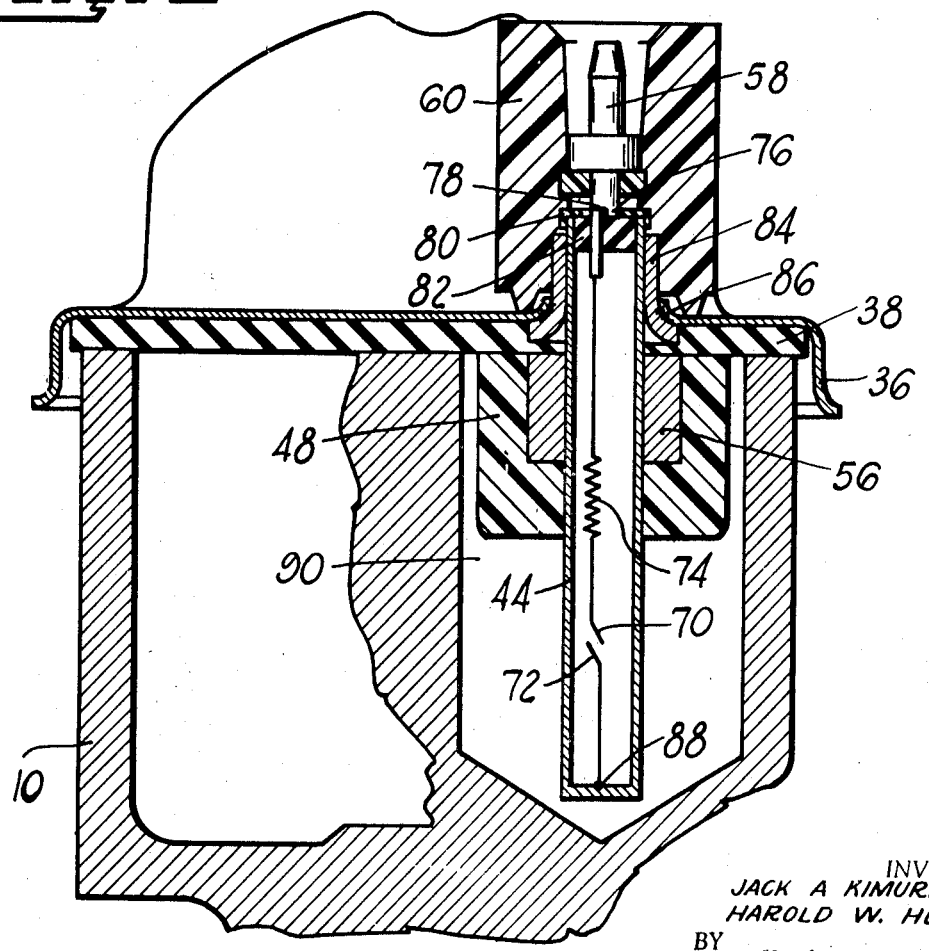

MASTER CYLINDER FLUID LEVEL INDICATOR

SUMMARY

Many practioners in the art of braking systems have devised means for indicating the level of fluid supply available for a braking system prior to the inroad of the motor vehicle safety standards. Examples of this are seen in U.S. Pat. Nos. 2,494,802; 2,613,293; 2,825,895 and 2,940,560 as well as in British Patent No. 626,993. However, these attempts at providing a solution to a problem in industry involved complicated and therefore costly structure to do a job which was simply to provide a means to indicate visually the depletion of brake fluid which would signal a leaking brake system prior to the complete failure of the system.

It is a principal object of this invention to simplify such a warning device by utilizing a simple hermetically sealed switch that is actuatable by a magnet means sensitive to the level of the fluid within a brake system reservoir.

DRAWING DESCRIPTION

Other objects and advantages of this invention will appear from the following description of the drawings in which:

FIG. 1 is a cross-sectional side view of a master cylinder employing a warning mechanism in its fluid reservoir in accordance with the principles of this invention;

FIG. 2 is a partial cross-sectional end view of the master cylinder and more particularly the reservoir and warning indicator mechanism employed therewithin;

FIG. 3 is a partial cross-sectional plan view of the master cylinder reservoir in the area of the partition separating the reservoirs;

FIG. 4 is a blown up partial cross-sectional end view of a master cylinder more particularly its reservoir with a modification to the manner of installing the warning mechanism therewithin;

FIG. 5 is a partial cross-sectional plan view of the partition means showing the well for the warning indicator means of FIG. 4; and FIG. 6 is a modification of a manner of attaching the warning switch mechanism to the cap of the master cylinder.

DETAILED DESCRIPTION

With more particular regard now to the drawings, there is shown in FIG. 1 a master cylinder housing 10 preferably of cast construction which is later machined to have a finished bore 12 and separate reservoir cavities 14 and 16 thereabove. A partition 18, to be described in further detail later, separates the master cylinder reservoir into the separate chambers 14 and 16 aforementioned. The reservoirs 14 and 16 are communicated to the bore 12 by means of compensating ports 20 and 22 and filler ports 24 and 26. Within the bore 12 a piston means comprising a floating piston 28 and a primary piston 30 are connected by means of a caged spring assembly 32 and positioned in the bore by a return spring 34, as will be familiar to those skilled in the art to which the invention relates. The master cylinder construction is then completed by joining a cap 36 to the peripheral walls of the reservoir with a sealing diaphragm 38 compressed therebetween by means of a bail 40, also as will be familiar to those skilled in the art. A fluid level warning indicator 2 is affixed to the cap to have a nonmagnetic tube portion 44 with a lower stop 46 within the reservoir chamber 16. Along the nonmagnetic tube portion 44 a float 48 is slidably carried that will rest on top of the fluid within the reservoir 16. This float should be constructed from a polyurethane or similar substance which is impervious to brake fluid.

This is more particularly seen in FIG. 2 showing the nonmagnetic tube 44 having a cap 50 electrically connected by ears 52 to the master cylinder cap 36 with the stop member 46 being an annular plastic member fitted over a flange 54 of the tube 44 so that the float 48, which is of a donut shape and provided with an annular magnet 56 adjacent the tube 44, is slidably arranged and contained on the tube 44. The indicator 42 has a connecting terminal 58 within a plastic cup 60 attached to the cap 50.

With reference to the partition 18 it is shown in more detail in FIG. 3 to comprise a curving wall between peripheral sidewalls 62 and 64 of the master cylinder reservoir of FIG. 1 prescribing a recessed cavity area 66 within which the warning indicator 42 is located. A passage 68 is provided through the partition 18 approximately three-fourths of an inch above the bottom of the reservoir in order to communicate the fluid between the reservoir chambers 14 and 16 down to a certain level and thereafter the chambers 14 and 16 will be segregated one from the other. It should be noted that the stop 46 on the tube 44 is located slightly above the height of this passage through the partition 18 so that the float will be operating the switch means completing the electrical circuitry to terminal 58 prior to the segregation of the chambers 14 and 16, as mentioned. In any event, the curving nature of the partition 18 is such as to dampen liquid motion in the reservoir chambers 14 and more particularly 16 and thereby eliminating the effect of such liquid motion on false signals for the warning indicator 42. In other words, sloshing fluid will not be available to trick the float 48 into operating the switch when it is not necessary or in deactivating the switch when it should be activated.

With reference now to the structure of FIG. 4 the internal details of the warning switch is shown in greater detail to comprise resilient switch contacts 70 and 72 within the nonmagnetic, electrically conductive housing 44. The contact 70 is connected through a resistor to a offset portion 76 of terminal 58 within the cup 60, as at 78. This connection is insulated from the housing 44 by means of a resilient cap 80 and plug 82 in the upper end of the housing. The housing 44 is connected to a sleeve 84 that is in turn connected by soldering, abutment or similar means as at 86 to the master cylinder cap 36. The other switch contact 72 is connected as at 88 to the nonmagnetic electrically conductive housing, so that, when magnet 56 is dropped to overlie the area of the resilient contacts 70 and 72 the electrical circuit will be complete from the cap 36 via the housing 44 through the contacts 72 and 70 to the connecting terminal 58. It should be noted in this FIG. 4 embodiment that the partition is formed to have a well 90 within which the warning indicator mechanism is located. This well 90 is shown in more detail in FIG. 5 and has passages 92 and 94, which are offset, leading from reservoir cavities 14 and 16 into the well 90. In utilizing a well the effect of sloshing fluid is minimized completely, and the offsetting of passages prevents surging of liquid in the well.

As for the structure of FIG. 6, the electrical contact between the housing 44 and the cap 36 is shown by means of a crimped sleeve 96 rather than as the type of sleeve 84 shown in FIG. 4 or the connection of cap 50 and cap 36 in FIG. 2.

It should be appreciated by those skilled in the art that the terminal 58 is connected by an electrical lead to a light in the dash of the vehicle or buzzer and provides the completion of the ground circuit to that indicator in the dash in most preferred installations so that whenever the contacts 70 and 72 are closed such indicator in the dash is activated and the vehicle operator is warned of a situation which requires attention.

It is believed that the operation of the device is readily apparent from the foregoing description of all of the embodiments contemplated by the inventor thus far. Therefore, it is not deemed necessary to go into an elaborate operative description of the invention.

Having fully described a construction of this invention with an indication of how it operates and its utilization, it is now desired to set forth the intended protection sought by these Letters Patents in the appended claims.

I claim:

1. In a master cylinder for use in a vehicle hydraulic braking system:

an electrically conductive housing connected to an electrical ground, said housing defining a bore therewithin and having an annular wall defining a fluid reservoir having an open upper end;

said reservoir being in fluid communication with said bore;

piston means slidably mounted in said bore for pressurizing fluid communicated from the reservoir to the bore when a brake application is effected;

an electrically conductive removable closure member for closing the open upper end of said reservoir;

a releasable retaining device for releasably securing said closure member to said housing;

an electrically conductive, tubular member carried by said cover member and electrically connected therewith, said tubular member extending vertically with respect to the cover member, one end of said tubular member extending downwardly with respect to the cover member into said fluid reservoir;

said tubular member and said cover member being removable as a unit from said housing when said releasable retaining device is released;

an electrical terminal carried by the other end of said tubular member and insulated electrically from the latter, said terminal being connected to a warning device, a source of electrical energy, and an electrical ground;

magnetically operated switch means housed within said tubular member and having a pair of contact elements;

one of said elements being connected to said terminal, the other element being connected to said tubular housing;

an annular float circumscribing said tubular member within said reservoir and adapted to move vertically within the latter in response to variations in the level of the fluid content of the reservoir;

stop means on said one end of said tubular member to prevent said float from falling off of said tubular member when the tubular member is removed from the reservoir; and a magnet mounted on said float;

said magnet closing said switch means when the level of the fluid content of the reservoir falls to a level disposing the magnet in a position wherein the magnetic field of the latter envelopes said contacts.